United States Patent
Kuhlmann et al.

(10) Patent No.: US 10,070,372 B2
(45) Date of Patent: Sep. 4, 2018

(54) MULTI-MODE MOBILE DEVICE

(71) Applicant: Airbus Operations GmbH, Hamburg (DE)

(72) Inventors: Holger Kuhlmann, Hamburg (DE); Kai Moeller, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/855,916

(22) Filed: Sep. 16, 2015

(65) Prior Publication Data
US 2016/0081008 A1 Mar. 17, 2016

(30) Foreign Application Priority Data
Sep. 17, 2014 (EP) .................................. 14185161

(51) Int. Cl.
| | |
|---|---|
| H04W 4/00 | (2018.01) |
| H04W 48/14 | (2009.01) |
| H04B 7/185 | (2006.01) |
| B64D 45/00 | (2006.01) |
| G08G 5/00 | (2006.01) |
| B64D 11/00 | (2006.01) |
| H04W 88/06 | (2009.01) |

(52) U.S. Cl.
CPC ......... *H04W 48/14* (2013.01); *B64D 11/0015* (2013.01); *B64D 45/00* (2013.01); *G08G 5/00* (2013.01); *H04B 7/18506* (2013.01); *H04B 7/18508* (2013.01); *B64D 2045/0085* (2013.01); *H04W 88/06* (2013.01)

(58) Field of Classification Search
CPC ........................ H04B 7/18506; H04B 7/18508; H04W 84/06

USPC ......................................................... 455/431
See application file for complete search history.

(56) References Cited

U.S. PATENT DOCUMENTS

| | | | |
|---|---|---|---|
| 7,343,157 B1* | 3/2008 | Mitchell | ............ H04B 7/18506 455/11.1 |
| 2003/0041155 A1 | 2/2003 | Nelson et al. | |
| 2003/0062447 A1 | 4/2003 | Cordina | |

(Continued)

FOREIGN PATENT DOCUMENTS

| | | |
|---|---|---|
| EP | 2166678 | 3/2010 |
| GB | 2393614 | 3/2004 |
| WO | 02103931 | 12/2002 |

OTHER PUBLICATIONS

European Search Report, dated Apr. 2, 2015.

Primary Examiner — Simon Nguyen
(74) Attorney, Agent, or Firm — Greer, Burns & Crain, Ltd.

(57) ABSTRACT

A mobile device for communicating with aircraft related systems, a device system comprising a plurality of such mobile devices, a system comprising such a mobile device and one or more aircraft related systems, and an aircraft comprising such a device system. According to a device embodiment, a mobile device comprises: a system interface via which the device is connectable to aircraft-related systems including one or more onboard systems provided onboard an aircraft and one or more off-board systems; and a control unit operable in a first mode to communicate, via the system interface, with the one or more onboard systems and operable in a second mode to communicate, via the system interface, with the one or more off-board systems.

21 Claims, 4 Drawing Sheets

(56) References Cited

U.S. PATENT DOCUMENTS

| | | | |
|---|---|---|---|
| 2004/0162067 A1 | 8/2004 | Stefani et al. | |
| 2005/0220055 A1 | 10/2005 | Nelson et al. | |
| 2008/0240029 A1* | 10/2008 | Lynch | H04B 7/18508 370/329 |
| 2010/0035607 A1* | 2/2010 | Horr | H04B 7/18508 455/428 |
| 2010/0075614 A1 | 3/2010 | Judd et al. | |
| 2010/0142482 A1* | 6/2010 | Lu | H04B 7/18506 370/331 |
| 2010/0304739 A1* | 12/2010 | Rooks | H04B 7/18506 455/431 |
| 2011/0241827 A1* | 10/2011 | Varoglu | H04B 7/185 340/5.52 |
| 2012/0303826 A1 | 11/2012 | Nelson et al. | |
| 2013/0029701 A1* | 1/2013 | Cabos | H04B 7/18502 455/466 |
| 2014/0380501 A1* | 12/2014 | Niss | H04L 63/08 726/27 |
| 2015/0005989 A1* | 1/2015 | Beltrand | B64C 19/00 701/3 |
| 2015/0351066 A1* | 12/2015 | Lauer | H04W 60/04 455/405 |
| 2016/0080069 A1* | 3/2016 | Horvitz | H04B 7/18504 370/316 |

* cited by examiner

MULTI-MODE MOBILE DEVICE

CROSS-REFERENCES TO RELATED APPLICATIONS

This application claims the benefit of the European patent application No. 14 185 161.8 filed on Sep. 17, 2014, the entire disclosures of which are incorporated herein by way of reference.

BACKGROUND OF THE INVENTION

The present disclosure generally relates to a multi-mode mobile user device. More specifically, the present disclosure relates to a mobile device for communicating with aircraft related systems, a device system comprising a plurality of such devices, a system comprising such a device and aircraft related systems, and an aircraft comprising such a device system.

Presently, proprietary mobile user devices are configured for use with only one of onboard systems provided on board an aircraft and off-board systems such as airline and airport servers.

Accordingly, there is a demand for convenient techniques for communicating with aircraft related systems present both on and off-board.

SUMMARY OF THE INVENTION

According to a first aspect, a mobile device is provided. The device (the term "device" is sometimes used in the following as an abbreviation for "mobile device") comprises a system interface and a control unit. Via the system interface, the device is connectable to aircraft related systems. The aircraft related systems include one or more onboard systems provided onboard an aircraft and one or more off-board systems. The control unit is operable in a first mode to communicate, via the system interface, with the one or more onboard systems and operable in a second mode to communicate, via the system interface, with the one or more off-board systems.

The mobile device may be or comprise a Commercial Off The Shelf (COTS) mobile device.

The system interface may be realized as a hardware component integrated into the device, such as, for example, as an interface card or other interface component installed in the device. The system interface may use one or more interfaces that are delivered within the device.

Onboard and off-board aircraft systems may be operable via COTS devices such as Notebooks, Tablets or Smartphones. For example, the interfaces for both on board and off-board aircraft systems are adapted to communicate with the device utilizing one or more COTS wireless communication techniques. Thus, proprietary avionic hardware is not needed for the device even if it is configured as a COTS device.

The system interface may include an interface module such as a COTS interface module. The control unit may be operable in the first mode to communicate, via the interface module such as the COTS interface module, with the one or more onboard systems and may be operable in the second mode to communicate, via the interface module such as the COTS interface module, with the one or more off-board systems.

The communication between the device and the aircraft related systems may be or comprise one-directional or bi-directional communication. For example, the control unit may be configured to one-directionally communicate with the aircraft related systems by transmitting data to the aircraft related systems via the system interface. Alternatively, the control unit may be configured to one-directionally communicate with the aircraft related systems by receiving data from the aircraft related systems via the system interface. Alternatively, the control unit may be configured to bi-directionally communicate with the aircraft related systems by transmitting data to and by receiving data from the aircraft related systems via the system interface.

As stated above, the communication between the device and the aircraft related systems may comprise COTS wireless communication techniques. For example, Wireless Local Area Network (WLAN) techniques which are also sometimes referred to as Wi-Fi techniques and/or Bluetooth techniques may be used for wireless communication. Also any other suitable radio frequencies/wireless communication techniques or lightwaves may be used for communication.

Connecting to the onboard and off-board systems may include a manual and/or an automatic component. For example, the control unit may be configured to, in response to a received user input, connect to the one or more onboard systems connectable to the system interface and/or the one or more off-board systems connectable to the system interface.

The control unit may also be configured to operate in the first mode if an onboard system signal is detected, and/or operate in the second mode if an off-board system signal is detected. In this case, the control unit may be configured to automatically set or switch the mobile device to the first mode or to automatically set or switch the mobile device to the second mode.

According to one conceivable realization, the control unit may be configured to: automatically detect the onboard system signal, if the onboard system signal is present, and to automatically connect to the one or more onboard systems, if the onboard system signal is detected. Alternatively or additionally, the control unit may be configured to automatically detect the off-board system signal, if the off-board system signal is present, and to automatically connect to the one or more off-board systems, if the off-board system signal is detected.

The control unit may be operable in a third mode to communicate, via the system interface, with a non-aircraft-related system. The third mode may be a private mode for a user to connect with non-aircraft-related system.

The control unit may be configured to simultaneously operate in the first and second mode. The control unit may be configured to not allow operation in the first or second mode if the control unit is operating in the third mode to ensure the integrity and isolate the aircraft-related systems from non-aircraft-related systems.

As mentioned above, the aircraft related systems comprise one or more onboard systems provided on board an aircraft. Additionally, the aircraft related systems comprise one or more off-board systems provided outside an aircraft, e.g., provided on ground. The control unit may communicate with (i) the one or more onboard systems provided on board the aircraft via the system interface (i.e., first mode) or (ii) the one or more off-board systems provided on ground via the system interface (i.e., second mode) or (iii) with both the one or more onboard systems provided on board the aircraft and the one or more off-board systems provided off-board, e.g., on ground, via the system interface (i.e., first and second modes).

The aircraft related systems may comprise any system typically arranged on board an aircraft, for example, any electronic or electrical system arranged on board an aircraft. Further, the aircraft related systems may comprise any system that is arranged off-board an aircraft, but that provides information associated with the aircraft.

Non-aircraft-related systems may comprise a public or private wireless network for connecting the device with the Internet.

The mobile device may comprise a user interface. The user interface may be configured to receive a user input and to output information corresponding to the received user input. For example, user interface may forward a received user input to the control unit. In this case, the control unit may, in response to the received user input, connect to the one or more onboard systems connectable to the system interface and the one or more off-board systems connectable to the system interface.

The user interface may comprise an output component configured to output information such as information retrieved from at least one of the aircraft related systems to which the device is connected. The user interface may comprise an input component configured to receive the user input. For example, the user interface may be configured as or comprise a display as an output component, for example a display with additional input options such as a touch-sensitive display. On the display, retrieved or input information may be displayed. Alternatively or additionally, the user interface may be configured as or comprise a speech input unit such as a microphone in order to receive a user input. Alternatively or additionally, the user interface may be configured as or comprises a gesture input unit configured to receive a gesture input as a user input. Further, the user interface may be configured as or comprise a speech output unit such as a loudspeaker in order to output retrieved information.

The user interface of the device may be configured to display status information of the aircraft related systems. For example, the control unit of the device may be configured to control the user interface to display such status information. The control unit may further be configured to generate one or more operating instructions and to forward the one or more operating instructions to the aircraft related systems upon an input received via the user interface. The operating instruction may comprise one or more parameters defining specifics of the operation to be performed. An aircraft related system receiving an operating instruction from the device may process the operating instruction and perform a corresponding operation in accordance with the operating instruction. The control unit may also be configured to receive status information communicated from the aircraft related system.

The control unit may be configured to generate one or more operating instructions. The control unit may be configured to operate the aircraft related systems by means of the one or more operating instructions. For example, the user input as received via the user interface may relate to or comprise information, e.g., maintenance information, which is to be stored in an aircraft related system. Such user input may be input by any aircraft or airport personnel such as maintenance personnel. In accordance therewith, the control unit may generate one or more operating instructions related to the maintenance information, instructing the aircraft related system to store the maintenance information as received via the user interface.

The control unit may be configured to obtain information to be forwarded to at least one of the aircraft related systems to which the device is connected from the user interface of the device. For example, the user interface may provide the control unit with a received user input, the control unit may generate an operating instruction corresponding to the received user input and the control unit may forward the operating instruction.

The control unit may be configured to control the aircraft related systems by means of the one or more operating instructions. For example, the user input as received via the user interface may relate to or comprise control information, e.g., one or more control instructions. The control information may enable control of an aircraft related system to which the device is connected via the system interface by means of the device. In other words, the aircraft related system may be controlled by the device. Such user input may be input by any aircraft personnel, airport personnel or passenger. Certain security functions may ensure that no security critical aircraft related systems may be accessed. In accordance therewith, the control unit may generate one or more operating instructions comprising control information, instructing the aircraft related system to perform certain functions in accordance with the control information as received via the user interface. For example, a passenger may access an entertainment system provided onboard the aircraft and may select certain functions, e.g., may start a movie, by means of the device.

The device may comprise a device interface. Via the device interface, the device may be connectable to at least one of one or more other devices and one or more mobile devices. The control unit may be configured to communicate with the at least one of the one or more other devices and the one or more mobile devices via the device interface. The one or more other devices may be configured in the same way as the device described herein. The one or more mobile devices may be configured as or comprise a mobile or portable terminal such as a notebook, a tablet and/or a smartphone. In this way, the device may allow communication between the device and one or more other devices or one or more mobile devices.

The control unit may be configured to forward information retrieved from at least one of the aircraft related systems to which the device is connected to a user interface of the device. The user interface may output the information received from the control unit. Alternatively or additionally, the control unit may be configured to forward information retrieved from at least one of the aircraft related systems to which the device is connected to a memory unit of the device. The memory unit may store the information received from the control unit. Alternatively or additionally, the control unit may be configured to forward information retrieved from at least one of the aircraft related systems to which the device is connected to a mobile device to which the device is connected via a device interface. The mobile device may store and/or further process the information received from the control unit.

The control unit may be configured to obtain information to be forwarded to at least one of the aircraft related systems to which the device is connected from a memory unit of the device. For example, the control unit may obtain a predefined operating instruction from the memory and may forward the operating instruction. Alternatively or additionally, the control unit may be configured to obtain information to be forwarded to at least one of the aircraft related systems to which the device is connected from a mobile device to which the device is connected via a device interface. For example, the mobile device may provide the control unit with an operating instruction corresponding to a user input received at the mobile device and the control unit may forward the operating instruction. In this case, the user input is not input on the device but on the mobile device connected thereto. Alternatively or additionally, the control unit may be configured to obtain information to be forwarded to at least one of the aircraft related systems to which the device is connected from another device to which the device is connected via a device interface. For example, said another device may provide the control unit with an operating instruction corresponding to a user input received at said another device and the control unit may forward the operating instruction. In this case, the user input is not input on the device but on said another device connected thereto.

The mobile device may be or comprise a wearable device. The wearable device may include an attachment unit configured to be attached to a body of a user. The attachment unit may be an integrated part of the wearable device. The wearable device may be attached to the body of a user via the attachment unit. The wearable device as described herein may comprise or may be configured as a head-mounted device such as glasses. Alternatively or additionally, the wearable device may comprise or may be configured as a wrist-attachable device such as a wristwatch. The wearable device may be configured as an input device that is configured to receive a user input. The wearable device may forward the received user input to a mobile device to which it is connected. The mobile device may then process the received user input as described herein. Alternatively or additionally, the wearable device may be configured as an output device that is configured to receive information from a mobile device to which it is connected. The wearable device may then output the received information.

The one or more onboard systems may comprise a cabin system (sometimes also referred to as cabin management system). The one or more onboard systems may comprise any number of network components or network devices such as sensors, actuators and the like.

The one or more onboard systems, e.g., a cabin system, may comprise a plurality of cabin components. Just to give examples for illustration rather than limitation, the cabin components may comprise or be configured as at least one of a passenger service unit, elements of a passenger service unit and a cabin illumination unit. Passenger service units may be arranged above the passenger seats and may provide passenger related functions to the passengers. For this purpose, passenger service units may comprise at least one of a fasten-seatbelt sign, a non-smoking sign, a flight attendant call button, a reading light and a loudspeaker. Cabin illumination units may be arranged in the cabin ceiling close to the overhead bins along the alleys of the cabin and may comprise, for example, LED strips or fluorescent light strips providing light to illuminate the cabin. A cabin component receiving an operating instruction from the control unit may process the operating instruction and perform an operation in accordance with the operating instruction. For example, a passenger service unit may receive an operating instruction to turn on the fasten-seatbelt sign and a cabin illumination unit may receive an operating instruction to reduce its brightness and generate a dimmed ambient light. Likewise, the control unit may retrieve information from a cabin component. For example, if a flight attendant call button is activated, the corresponding passenger service unit may forward information to the control unit informing the control unit that a certain flight attendant call button has been activated. The corresponding information may be output, e.g., displayed, on the user interface to inform the flight attendant carrying the device.

The one or more onboard systems may comprise a Flight-Attendant Panel (FAP) provided onboard an aircraft. In this case, the control unit may be configured to communicate with the FAP. Alternatively or additionally, the one or more onboard systems may comprise a Cabin Intercommunication Data System (CIDS) provided onboard an aircraft. In this case, the control unit may be configured to communicate with the CIDS. Also, future developments and deployments of such CIDSs such as the so-called Cabin Core Backbone may be used, for sake of explanation rather than limitation, as the one or more onboard systems. The one or more onboard systems may comprise an entertainment system provided on board the aircraft.

The aircraft related systems may comprise a maintenance system provided onboard or off-board the aircraft. The control unit may be configured to receive maintenance information from the maintenance system provided onboard the aircraft and/or the maintenance system provided off-board the aircraft. The maintenance information may comprise information indicating a state of a component or device provided on board an aircraft. The maintenance information may indicate which component or device requires maintenance. Further, the control unit may be configured to forward maintenance information to an onboard system and/or an off-board system. The maintenance information may comprise information indicating a state of a component or device provided on board an aircraft. The maintenance information may indicate which component or device requires maintenance.

The aircraft related systems may comprise a connectivity system provided onboard an aircraft. An aircraft connectivity system may provide Internet Protocol (IP) based connectivity, for example via a connected ground network, towards the public Internet. Any client connected onboard through a wired or wireless connection (for example, Wireless Local Area Network (WLAN) technology may be used) can send and retrieve IP based data through the connected ground network with any IP based ground server connected to the Internet in, for example, operating in the third mode. The ground network may be connected via satellites (e.g., aircraft satcom system) or wireless equipped Airport Gatelink systems. Such wireless Airport Gatelink systems are standardized in Aeronautical Radio, Incorporated (ARINC) 763/822, for example. Alternatively or additionally, the aircraft related systems may comprise an information system provided onboard the aircraft.

Alternatively or additionally, the aircraft related systems may comprise an aircraft system providing aircraft avionic data. In this way, a user may retrieve avionic data from the aircraft avionic system and may display the retrieved avionic data on the user interface of the device.

For example, a user interested in the location of the aircraft or other avionic data such as velocity or altitude of the aircraft, may input a user input via the user interface requesting such avionic data from the avionic system. The requested avionic data may then be forwarded to the control unit via the system interface and may then be output on the user interface.

Summarizing the above, for sake of explanation rather than limitation, the control unit may be configured to forward, via a COTS wireless communication technique, the operating instructions to at least one of an FAP provided on board the aircraft, maintenance system provided on board or off-board an aircraft, a connectivity system provided onboard or off-board an aircraft, an information system provided onboard or off-board an aircraft, and an aircraft system, provided onboard or off-board an aircraft, providing aircraft avionic data.

The one or more off-board systems may comprise an airline system such as a check-in system of an airline.

According to a second aspect, a device system is provided. The device system comprises a plurality of devices as described herein. At least a subset of the devices may be interconnected with each other.

According to a third aspect, a system comprising a device as described herein and one or more aircraft related systems as described herein is provided. In accordance therewith, the control unit may be configured to operate the one or more aircraft related systems by means of the one or more operating instructions.

According to a fourth aspect, an aircraft comprising a device system as described herein may be provided.

According to a fifth aspect, a computer program may be provided. The computer program may be stored on the device. For example, the computer program may be stored in the control unit or a memory unit of the control unit. The computer program comprises program code portions for carrying out one or more of the aspects described herein, when the computer program is run or executed on the device such as a microprocessor, a microcontroller or a digital signal processor (DSP) of the device.

Even if some of the above aspects are described herein with respect to data device, the device system or the aircraft, these aspects may also be implemented as a method or as a computer program for performing or executing the method. Likewise, aspects described as or with reference to a method may be realized by suitable units (even if not explicitly mentioned) in the device, the device system or the aircraft or by means of the computer program. All of the above described aspects may be implemented by hardware circuitry and/or by software.

BRIEF DESCRIPTION OF THE DRAWINGS

In the following, the present disclosure will further be described with reference to an exemplary embodiment illustrated in the figures, in which.

DETAILED DESCRIPTION OF THE PREFERRED EMBODIMENTS

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, the skilled person will appreciate that the present disclosure may be practiced with other aircraft related information different from the specific examples discussed below to illustrate the present disclosure. Even if in the below the present disclosure is described only with respect to specific aircraft related systems, the disclosure may equally be practiced with other aircraft related systems. Further, even if in the below the present disclosure is described only with respect to two aircraft related systems, the disclosure may equally be practiced in any other environment having a different number of aircraft related systems.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the present disclosure is described as a method, it may also be embodied in a device (e.g., COTS mobile device described below or device system), a computer processor and a memory coupled to a processor, wherein the memory is encoded with one or more programs that perform the methods disclosed herein when executed by the processor.

In the following, for sake of explanation rather than limitation, a COTS mobile device is used as an example of a mobile device. In other words, it is assumed by way of example in the following that the mobile device is configured as a COTS mobile device.

Figure 1:
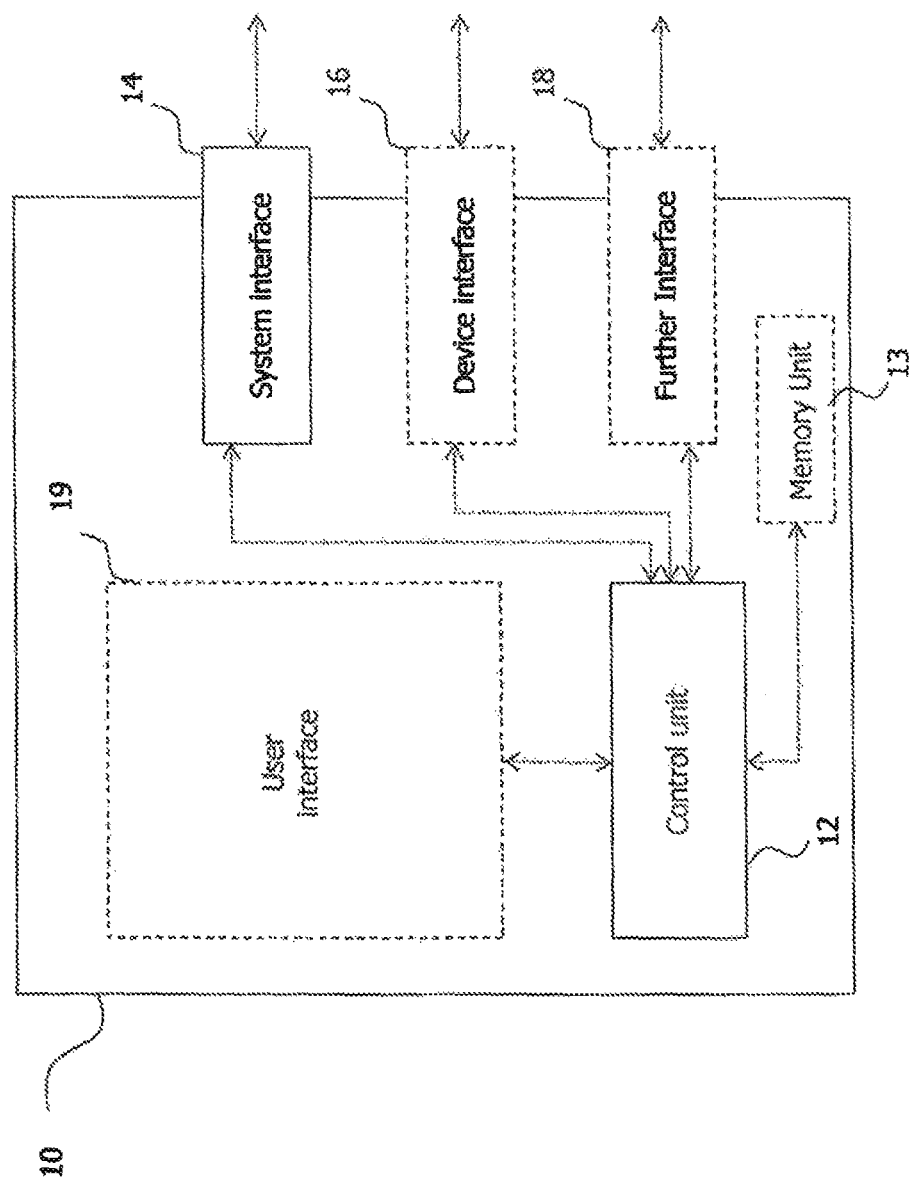
FIG. 1 schematically illustrates a device embodiment of a COTS mobile device that is connectable to aircraft related systems.

FIG. 1 schematically illustrates a device embodiment of a COTS mobile device 10 that is connectable to aircraft-related systems. The device 10 comprises a control unit 12 and a system interface 14. Via the system interface 14 the device 10 is connectable to aircraft related systems in order to operate the aircraft related systems.

Figure 2:
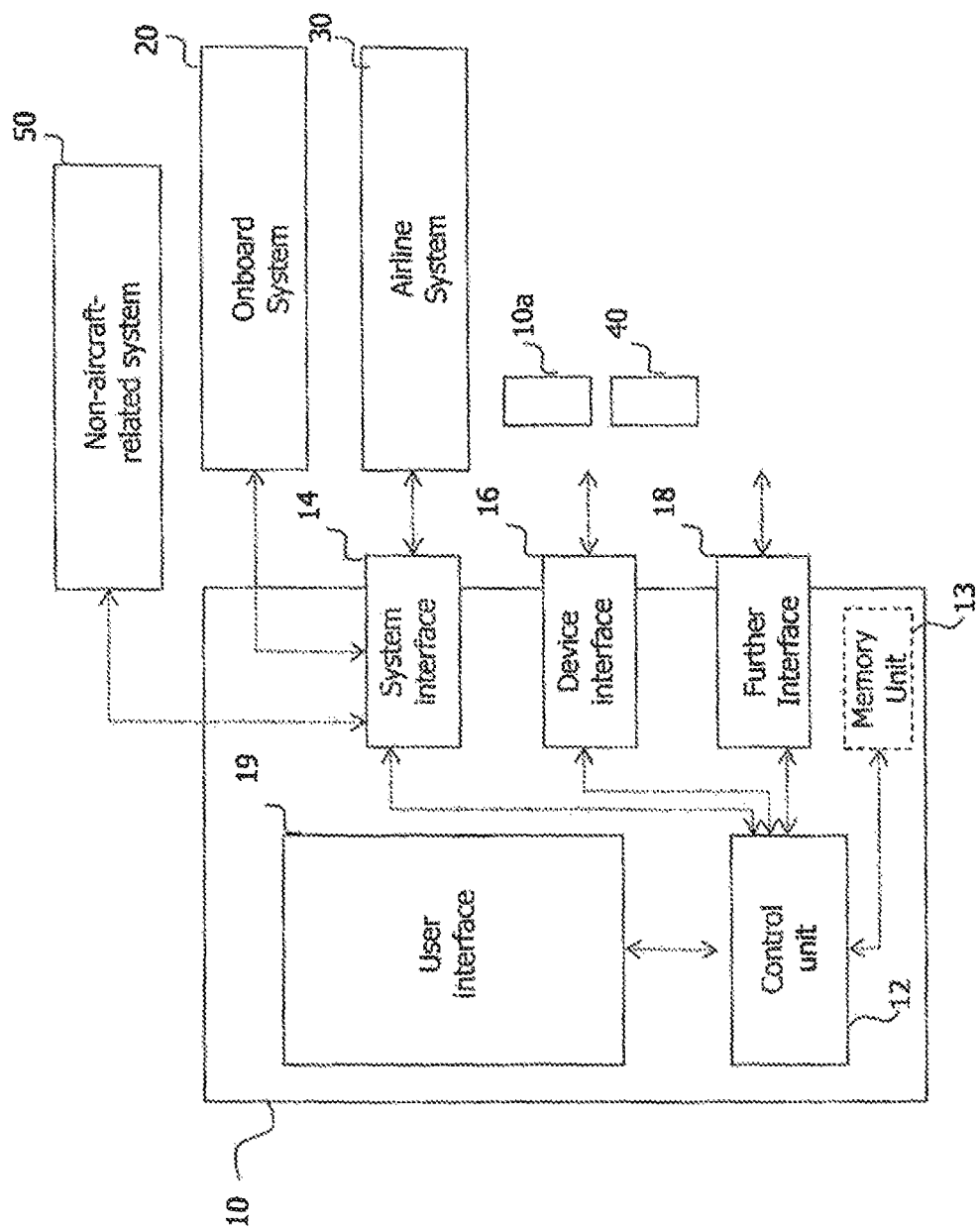
FIG. 2 schematically illustrates a device embodiment of the device of FIG. 1 connected with aircraft related systems and devices to form a device system.

Referring to FIG. 2, for sake of explanation rather than limitation, an onboard system 20 provided on board an aircraft is shown as an example of an aircraft related system. Further, for sake of explanation rather than limitation, an airline system 30 provided on ground is shown as another example of an aircraft related system. The system interface 14 may connect the device 10 to the onboard system 20 and the airline system 30 independently from each other or in parallel to each other via or wired or wireless data connection. In other words, the system interface 14 may connect the device 10, via a wired or wireless data connection, with (i) only the onboard system 20 or (ii) only the airline system 30 or (iii) both the onboard system 20 and the airline system 30, as explained in more detail in FIGS. 3A to 3D.

By way of example, the control unit 12 is configured to operate the onboard system 20 and the airline system 30 via the system interface 14. However, it may equally be possible that the control unit 12 is configured to operate the onboard system 20 only during a certain time period or the airline system 30 only during a certain time period via the system interface 14. For example, when the aircraft is in the air, the control unit 12 may only operate the onboard system 20. When the aircraft is on ground, the control unit 12 may operate the onboard system 20 and/or the airline system 30.

Via the system interface 14 the device 10 is also connectable to one or more private or public network systems 50 for, for example, accessing the Internet.

Returning to FIG. 1, the device 10 may further comprise a memory unit 13, a device interface 16, a further interface 18 (in order to provide an interface for possible further usage) and a user interface 19.

Via the device interface 16, the device 10 is connectable to at least one of one or more other devices 10a and one or more mobile devices 40, one of each is shown by way of example in FIG. 2. The control unit 12 is configured to communicate with the other device 10a and the mobile device 40 via the device interface 16. In FIG. 2, only one other device 10a and one mobile device 40 are shown by way of example. However, the device 10 may communicate with any number of other devices 10a and/or mobile devices 40.

A user may input an input via the user interface 19. In the present example, the user interface 19 comprises a touch-sensitive display unit and a speech input/output unit. The display part of the touch-sensitive display unit functions as an output unit and the touch-sensitive part of the touch-sensitive display unit functions as an input unit. Likewise, a loudspeaker part of the speech input/output unit functions as an output unit and a microphone part of the speech input/output unit functions as an input unit. Although not explicitly shown in the figure, gesture techniques may be used for inputting a user input. For example, a gesture input unit may be provided to receive a gesture input of a user. In response to the input received via the user interface 19, the control unit 12 may generate corresponding operating instructions and may communicate the generated operating instructions to the onboard system 20 and/or the airline system 30.

In accordance with a first example, the onboard system 20 may comprise an entertainment system provided on board the aircraft. A passenger using the device 10 may access the entertainment system in order to select certain functions. For example, the passenger may select a movie provided by the entertainment system via the user interface 19 of the device 10. Certain security functions may ensure that no security critical aircraft related systems can be accessed by the passenger's device 10.

In accordance with a second example, the onboard system 20 may comprise an aircraft avionic system provided onboard the aircraft. A passenger using the device 10 may access the avionic system in order to select retrieval of certain avionic data. For example, the passenger may select avionic data such as data about the altitude or velocity of the aircraft as provided by the avionic system via the user interface 19 of the device 10. The avionic data may then be retrieved in accordance with the command of the user and may then be displayed on the user interface 19.

In accordance with a third example, the airline system 30 may comprise a maintenance system. The control unit 12 may be configured to receive maintenance information from the maintenance system. The maintenance information may comprise information indicating a state of a component or device provided on board an aircraft. The maintenance information may indicate which component or device requires maintenance. Further, the control unit 12 may be configured to forward maintenance information to the maintenance system.

The maintenance information may comprise information indicating a state of a component or device provided on board an aircraft. The maintenance information may indicate which component or device requires maintenance. For example, maintenance personnel using the device 10 may acquire information about the state of a component or device provided on board the aircraft and may forward the acquired information as maintenance information to the maintenance system. Further, the maintenance personnel may input via the user interface 19 that the maintenance information is to be stored in the maintenance system. The control unit 12 may generate operating instructions instructing the maintenance system to store the maintenance information. Likewise, the maintenance personnel may retrieve maintenance information from the maintenance system in accordance with the operating instructions received via the user interface 19. The retrieved information may then be output on the user interface 19. In this way, the maintenance personnel may compare the retrieved information with a component or device on board an aircraft. For example, damage of a component or device may be determined by way of this comparison.

Figure 3A:
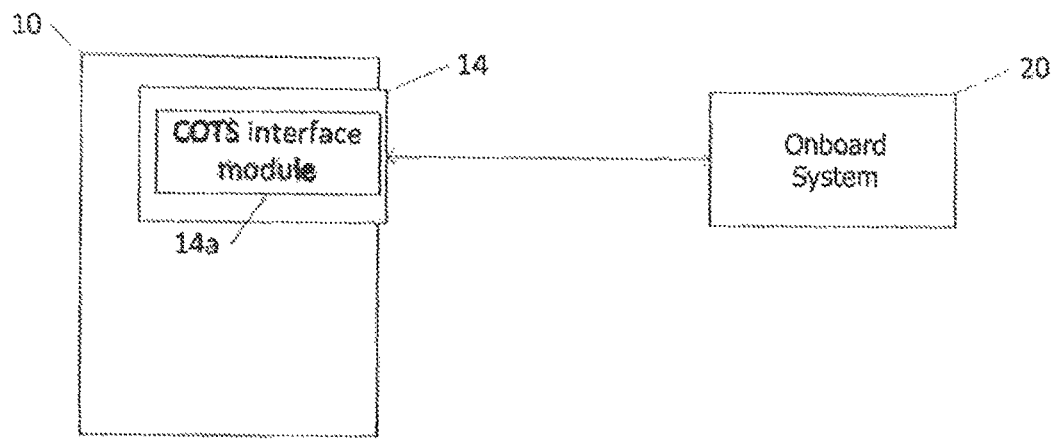
FIGS. 3A to 3D schematically illustrate a device embodiment of the device of FIG. 1 operating in different modes to connect with aircraft related systems.

FIGS. 3A to 3D schematically illustrate a device embodiment of a COTS mobile device 10 that is connectable to aircraft-related systems. The device 10 of FIGS. 3A to 3D may correspond to the device 10 shown in FIGS. 1 and 2. FIG. 3A shows the device 10 operating in a first mode to communicate, via the system interface 14, with the onboard system 20. The system interface 14 includes a COTS interface module 14a for communicating with the onboard system 20 utilizing a COTS wireless communication technique. The first mode may be a mode for the device to connect to onboard systems.

Figure 3B:
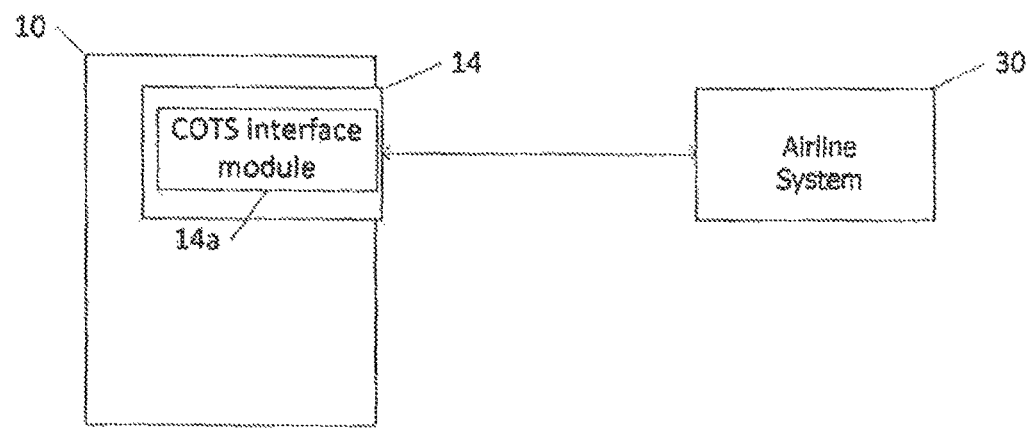

FIG. 3B shows the device 10 operating in a second mode to communicate, via the system interface 14, with the off-board system 30. The system interface 14 includes a COTS interface module 14a for communicating with the off-board system 30 utilizing a COTS wireless communication technique. The second mode may be a mode for the device to connect to off-board systems such as systems provided on ground.

Figure 3C:
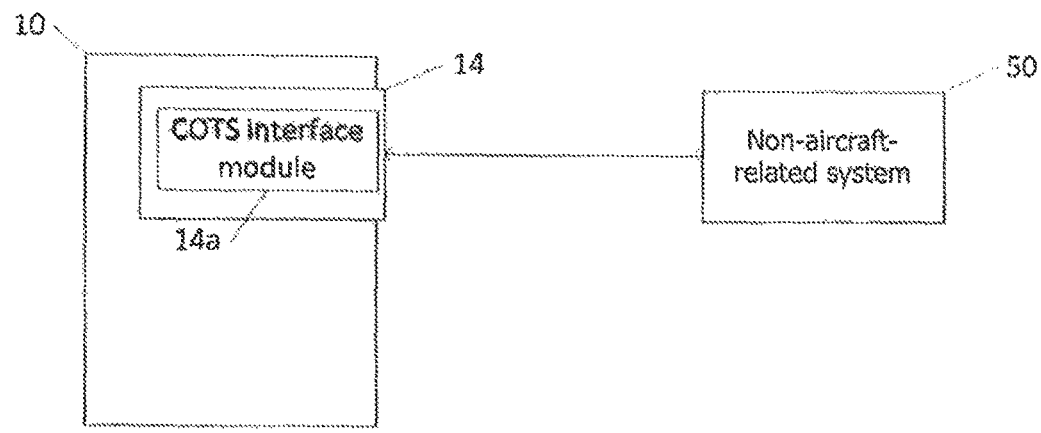

FIG. 3C shows the device 10 operating in a third mode to communicate via the system interface 14, with the non-aircraft-related system 50. The system interface 14 includes a COTS interface module 14a for communicating with the non-aircraft-related system 50 utilizing a COTS wireless communication technique. The third mode may be a private mode for the device to connect to, for example, a wireless network so that a user may browse the Internet.

Figure 3D:
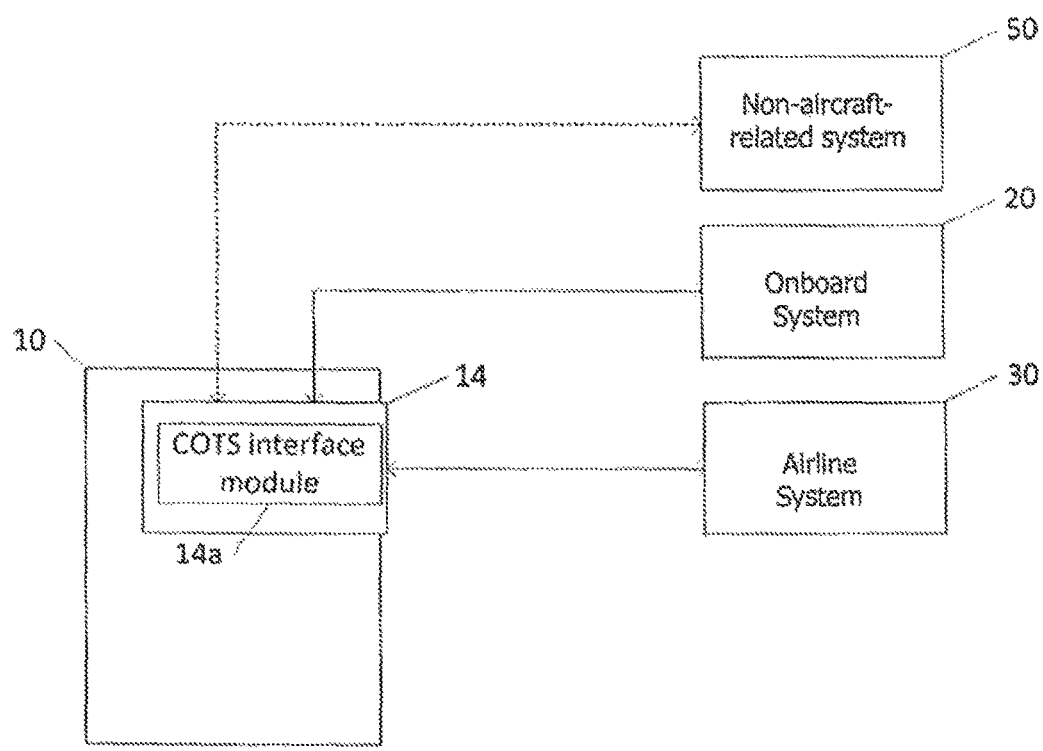

FIG. 3D shows the device 10 operating in both the first and second modes to communicate, via the system interface 14, with the onboard system 20 and the off-board system 30. The device 10 may further connect to the non-aircraft-related system 50. Alternatively, the control unit of device 10 may be configured such that a user may only connect to one of aircraft related and non-aircraft-related systems, but not both. For example, the device may contemporarily connect to systems 20 and 30, but if connected to system 50, connections further connections to systems 20 and 30 are blocked.

For example, control unit 12 may be configured to not allow operation in the first or second mode if the control unit is operating in the third mode to ensure the integrity and isolate the aircraft-related systems from non-aircraft-related systems.

The decision whether to connect to the onboard system 20 and/or the off-board system 30 may include a manual and/or an automatic component. For example, before a crew member boards an aircraft, the control unit 12 may connect to the off-board system 30 via the system interface 14 upon receipt of a manual user input or based on an automatic procedure. To give an example for explanation rather than limitation, the passenger data may be retrieved from the off-board system 30 by the device 10. Then, on board the aircraft, the crew member may require crew information, e.g., information specifying the crew on board the aircraft. For this purpose, the control unit 12 may connect to the onboard system 20 via the system interface 14 upon receipt of a manual user input or based on an automatic procedure. The automatic procedure may comprise automatically connecting to the onboard system 20 if an onboard system signal is detected, and automatically connecting to the off-board system 30 if an off-board system signal is detected.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mobile device comprising:
a system interface via which the device is connectable to aircraft-related systems including one or more onboard systems provided onboard an aircraft and one or more off-board systems and connectable to one or more non-aircraft-related systems; and
a control unit operable in a first mode to communicate, via the system interface, with the one or more onboard systems, operable in a second mode to communicate, via the system interface, with the one or more off-board systems, and operable in a third mode to communicate, via the system interface with the one or more non-aircraft-related systems,
wherein the control unit and the system interface are configured to isolate the aircraft-related systems from the one or more non-aircraft-related systems and to not allow operation in the first or second mode, if the control unit is operating in the third mode, and
wherein, for all modes, airworthiness-related onboard systems are protected from non-airworthiness-related onboard systems by the control unit and/or the system interface.

2. The device of claim 1, wherein the system interface includes an interface module and the control unit is operable in the first mode to communicate, via the interface module, with the one or more onboard systems and operable in the second mode to communicate, via the interface module, with the one or more off-board systems.

3. The device of claim 1, wherein the control unit is configured to, in response to the received user input, connect to the one or more onboard systems connectable to the system interface and/or the one or more off-board systems connectable to the system interface.

4. The device of claim 1, wherein the control unit is configured to at least one of:
operate in the first mode if an onboard system signal is detected, and
operate in the second mode if an off-board system signal is detected.

5. The device of claim 4, wherein the control unit is configured to at least one of:
automatically detect the onboard system signal, if the onboard system signal is present, and automatically connect to the one or more onboard systems, if the onboard system signal is detected, and
automatically detect the off-board system signal, if the off-board system signal is present, and automatically connect to the one or more off-board systems, if the off-board system signal is detected.

6. The device of claim 1, wherein the control unit is configured to simultaneously operate in the first and second mode.

7. The device of claim 1, wherein the control unit is configured to communicate, via the system interface, with the one or more onboard systems to operate the one or more onboard systems.

8. The device of claim 1, the device further comprising:
a user interface configured to receive a user input and to output information corresponding to the received user input.

9. The device of claim 8, wherein the user interface is further configured to output information received from the one or more onboard systems.

10. The device of claim 1, wherein the control unit is configured to communicate, via the system interface, with at least one of:
a Flight-Attendant Panel provided on board the aircraft,
a Cabin Intercommunication Data System provided on board an aircraft,
a maintenance system provided on board or off-board an aircraft,
a connectivity system provided onboard or off-board an aircraft,
an information system provided onboard or off-board an aircraft, and
an aircraft system providing aircraft avionic data.

11. The device of claim 1 incorporated into a system comprising a plurality of the devices.

12. The devices of claim 11, wherein a plurality of the devices are interconnected with each other.

13. The devices of claim 11 incorporated into an aircraft.

14. The device of claim 11 wherein the system is incorporated into an aircraft.

15. The device of claim 1 incorporated into a system comprising a one or more aircraft-related systems.

16. The device of claim 1, wherein the control unit is further configured to prevent operation in the first or second mode if the control unit is operating in the third mode.

17. The device of claim 1, wherein the one or more onboard systems comprise private and/or public networks.

18. The device of claim 1, wherein the one or more non-aircraft-related systems comprise airport systems, ground service systems, private and/or public networks.

19. A mobile device comprising:
a system interface via which the device is connectable to aircraft-related systems including one or more onboard systems provided onboard an aircraft and one or more off-board systems and connectable to one or more non-aircraft-related systems; and
a control unit operable in a first mode to communicate, via the system interface, with the one or more onboard systems, operable in a second mode to communicate, via the system interface, with the one or more off-board systems, and operable in a third mode to communicate, via the system interface, with the one or more non-aircraft-related systems,
wherein the control unit is configured to isolate the aircraft-related systems from the one or more non-aircraft-related systems and to not allow operation in the first or second mode, if the control unit is operating in the third mode while the mobile device is onboard the aircraft, and the control unit remains operating in the third mode while the aircraft-related systems are isolated.

20. The device of claim 19, wherein the control unit is further configured to block connections of the mobile device to the aircraft-related systems if the control unit is operating in the third mode.

21. A mobile device comprising:
- a system interface via which the mobile device is connectable to aircraft-related systems including one or more onboard systems provided onboard an aircraft and one or more off-board systems and connectable to one or more non-aircraft-related systems, and
- a control unit operable in a first mode to communicate, via the system interface, with the one or more onboard systems, operable in a second mode to communicate, via the system interface, with the one or more off-board systems, and operable in a third mode to communicate, via the system interface, with the one or more non-aircraft-related systems,
- wherein the control unit is configured to block connections of the mobile device to the aircraft-related systems and to not allow operation in the first or second mode, if the control unit is operating in the third mode, and the control unit remains operating in the third mode while the connections to the aircraft-related systems are blocked.

* * * * *